US010372929B1

United States Patent
Hensley et al.

(10) Patent No.: US 10,372,929 B1
(45) Date of Patent: *Aug. 6, 2019

(54) SECURE FILE TRANSFER AND NOTIFICATION SERVER

(71) Applicant: Progress Software Corporation, Bedford, MA (US)

(72) Inventors: John Alan Hensley, Raleigh, NC (US); Robert Fischer, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/264,200

(22) Filed: Sep. 13, 2016

Related U.S. Application Data

(63) Continuation of application No. 14/536,468, filed on Nov. 7, 2014, now Pat. No. 9,473,506, which is a continuation-in-part of application No. 14/514,244, filed on Oct. 14, 2014, now Pat. No. 9,531,678.

(60) Provisional application No. 61/891,290, filed on Oct. 15, 2013, provisional application No. 61/904,997, filed on Nov. 15, 2013.

(51) Int. Cl.
*H04L 29/06* (2006.01)
*G06F 21/62* (2013.01)
*H04L 29/08* (2006.01)

(52) U.S. Cl.
CPC .......... *G06F 21/6218* (2013.01); *H04L 63/06* (2013.01); *H04L 63/061* (2013.01); *H04L 67/02* (2013.01)

(58) Field of Classification Search
USPC ....................................................... 713/165
See application file for complete search history.

(56) References Cited

U.S. PATENT DOCUMENTS

| 6,081,900 A * | 6/2000 | Subramaniam | ...... G06Q 20/382 707/999.01 |
| 7,010,702 B1 * | 3/2006 | Bots | .............. H04L 12/46 713/153 |
| 7,231,664 B2 * | 6/2007 | Markham | ......... H04L 63/0272 455/445 |

(Continued)

FOREIGN PATENT DOCUMENTS

EP   2819363   12/2014

OTHER PUBLICATIONS

"User Datagram Protocol." Wikipedia. Wikimedia Foundation. Jan. 23, 2015. Web. Feb. 16, 2015. 6 pages. Downloaded from: <http://en.wikipedia.org/wiki/User_Datagram_Protocol>.

(Continued)

*Primary Examiner* — Amare F Tabor

(57) ABSTRACT

A system, method and computer readable medium for secure file transfer is disclosed. In one embodiment, the system encrypts a file; sends, via a secure channel, a packet to a group having one or more members, the group authorized to access the encrypted file, the packet associated with the encrypted file and including access information for the encrypted file; receives a first request for the encrypted file from a first requestor; and sends the encrypted file to the first requestor via an unsecured channel that performs caching, wherein the first requestor is able to access the encrypted file using the packet when the first requestor is a member of the group authorized to access the encrypted file and received the packet via the secure channel and unable to access the encrypted file when the first requestor is not a member of the group authorized to access the encrypted file.

20 Claims, 9 Drawing Sheets

(56) References Cited

U.S. PATENT DOCUMENTS

| | | | |
|---|---|---|---|
| 7,269,848 B2* | 9/2007 | Seshadri | G06F 21/31 370/351 |
| 7,480,065 B1 | 1/2009 | Trandal et al. | |
| 7,509,492 B2* | 3/2009 | Boyen et al. | H04L 12/46 708/203 |
| 7,617,527 B2* | 11/2009 | Bots | H04L 12/46 708/203 |
| 7,688,981 B2* | 3/2010 | Halasz | H04L 9/0822 380/277 |
| 7,748,045 B2* | 6/2010 | Kenrich | G06Q 20/3674 705/50 |
| 8,447,871 B1 | 5/2013 | Szabo | |
| 9,390,298 B2 | 7/2016 | Nguyen | |
| 9,473,506 B1 | 10/2016 | Hensley et al. | |
| 9,531,678 B1 | 12/2016 | Hensley et al. | |
| 2004/0107342 A1 | 6/2004 | Pham et al. | |
| 2005/0071657 A1 | 3/2005 | Ryan | |
| 2005/0071658 A1 | 3/2005 | Nath et al. | |
| 2005/0086289 A1 | 4/2005 | Rosenberg et al. | |
| 2005/0226257 A1* | 10/2005 | Mirzabegian | H04L 12/2801 370/401 |
| 2006/0050700 A1 | 3/2006 | Ravikumar | |
| 2008/0133915 A1 | 6/2008 | Tanaka | |
| 2008/0282081 A1 | 11/2008 | Patiejunas | |
| 2009/0049200 A1 | 2/2009 | Lin et al. | |
| 2009/0125627 A1 | 5/2009 | Ford | |
| 2010/0011091 A1 | 1/2010 | Carver et al. | |
| 2010/0192210 A1 | 7/2010 | Purdy | |
| 2010/0242096 A1 | 9/2010 | Varadharajan et al. | |
| 2010/0257372 A1 | 10/2010 | Seifert | |
| 2010/0313009 A1* | 12/2010 | Combet | G06Q 30/0204 713/150 |
| 2011/0153822 A1 | 6/2011 | Rajan et al. | |
| 2012/0072713 A1* | 3/2012 | Begum | H04L 9/0822 713/153 |
| 2012/0179905 A1 | 7/2012 | Ackerly | |
| 2012/0188928 A1 | 7/2012 | Wang et al. | |
| 2013/0117461 A1 | 5/2013 | Hsu | |
| 2013/0219468 A1 | 8/2013 | Bell | |
| 2014/0372508 A1 | 12/2014 | Fausak | |
| 2015/0026460 A1 | 1/2015 | Walton et al. | |
| 2015/0026474 A1* | 1/2015 | Irvine | G06F 21/31 713/171 |
| 2015/0052373 A1 | 2/2015 | Gatta et al. | |
| 2015/0074794 A1 | 3/2015 | Chuang | |
| 2015/0215185 A1 | 7/2015 | Thaler et al. | |
| 2015/0341443 A1 | 11/2015 | Shen et al. | |

OTHER PUBLICATIONS

Non-Final Office Action for U.S. Appl. No. 15/353,588 dated Oct. 5, 2017, 14 pages.

\* cited by examiner

SECURE FILE TRANSFER AND NOTIFICATION SERVER

CROSS REFERENCE TO RELATED APPLICATIONS

The present application is a continuation of U.S. patent application Ser. No. 14/536,468, entitled "Secure File Transfer & Notification Server," filed on Nov. 7, 2014, which claims priority, under 35 U.S.C. § 119(e), of U.S. Provisional Patent Application No. 61/904,997, filed Nov. 15, 2013 and entitled "Secure File Transfer & Notification Server," the entireties of which are hereby incorporated by reference.

U.S. patent application Ser. No. 14/536,468 is also a continuation in part of U.S. patent application Ser. No. 14/514,244, entitled "On-Premises Data Access and Firewall Tunneling," filed on Oct. 14, 2014, which claims the benefit under 35 U.S.C. § 119(e), of U.S. Provisional Patent Application No. 61/891,290, entitled "On-Premises Data Access and Firewall Tunneling," filed on Oct. 15, 2013," the entireties of which are hereby incorporated by reference.

Applicants hereby notify the USPTO that the claims of the present application are different from those of the parent application and any other related applications. Therefore, Applicants rescind any disclaimer of claim scope made in the parent application or any other predecessor application in relation to the present application. The Examiner is therefore advised that any such disclaimer and the cited reference that it was made to avoid may need to be revisited at this time. Furthermore, the Examiner is also reminded that any disclaimer made in the present application should not be read into or against the parent application, the grandparent application or any other related application.

FIELD OF INVENTION

The present disclosure relates secure file transfer and notifying a device behind a network separation device (e.g. a firewall and/or network address translator (NAT)) to perform an action.

BACKGROUND

Caching in a network may reduce loads on servers that are sending identical information to multiple clients. For example, Hypertext Transfer Protocol (HTTP) provides for caching of files along a pipeline so that the file may be provided from the cache when a subsequent request is received. Providing the file from the cache may beneficially reduce bandwidth consumption on the network, reduce the number of hits to the server hosting the original file and reduce the amount of time it takes for the client to receive the file. However, it may be desirable at times to use a secure connection for the transfer of files.

Secure connections prevent caching and thus eliminate the above benefits. For example, a secure connection using the Secure Socket Layer (SSL) prevents HTTP caching. Moreover, a secure connection (e.g. HTTPS) may require that each client make a connection using a security token unique to the client. Caching the content of such an encrypted stream provides no useful benefit. For example, assume a first member of a group authorized to access a file obtains the file over a secure HTTPS connection and that file (despite the fact that HTTPS prevents caching) was cached along the pipeline and a second group member were to subsequently obtained that file from the cache, the second group member does not have the first member's unique security token and would not be able to use the file obtained from the cache.

A first problem is that current systems and transfer protocols do not provide for the secure transmission of a file to a group of authorized users that benefits from the caching of that file. A second problem is that current systems and transfer protocols do not provide for the secure transmission of a file to a group of authorized users in a manner that benefits from existing caching mechanisms. A third problem is the difficulty of notifying a device or its user to take an action (e.g. to obtain the file) when the device is behind a network separation device (e.g. a firewall and/or Network Address Translator (NAT)).

SUMMARY

In one embodiment, a resource management module receives a new file. A shared key generator module generates an encryption key. A file encryption module encrypts the new file with the encryption key. A group management module identifies a group associated with the new file. A notification module notifies the group members of the new file's existence. A packet creation module provides the packet including the encryption key to the group member(s) via the secure channel. A server receives a request for the encrypted file via an unsecure channel and sends the encrypted file to the requestor. The encrypted file is cached en route.

In one embodiment, a notification server receives an initialization request from a device behind a network separation device (e.g. a NAT and/or firewall). The notification server sends keep alive packets to the device behind the NAT and/or firewall and/or receives keep alive packets from the device behind the NAT and/or firewall. The notification server determines whether a request to notify a device behind the NAT and/or firewall has been received. When a request to notify a device behind the NAT and/or firewall has been received, the notification server determines a recipient device behind the NAT and/or firewall that the notification server is in communication with and sends the notification message to the device behind the NAT and/or firewall.

The features and advantages described herein are not all-inclusive and many additional features and advantages will be apparent in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
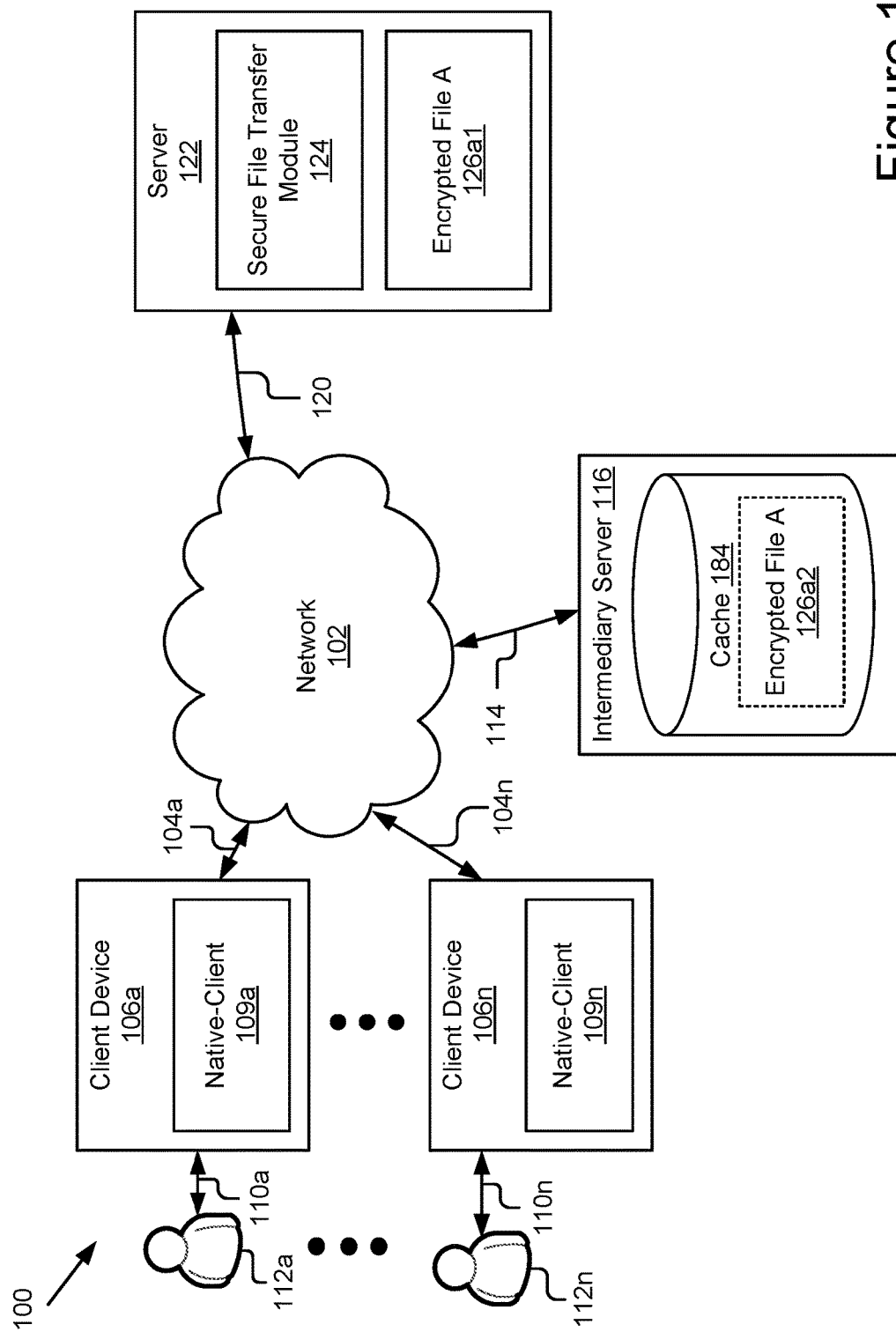
FIG. 1 is a high-level block diagram illustrating an example system for secure file transfer according to one embodiment.

FIG. 1 is a high-level block diagram illustrating an example system 100 for secure file transfer according to one embodiment. The illustrated system 100 includes client devices 106a . . . 106n, an intermediary server 116 and a server 122, which are communicatively coupled via a network 102 for interaction with one another. For example, the client devices 106a . . . 106n (also referred to individually and collectively as 106) may be respectively coupled to the network 102 via signal lines 104a . . . 104n and may be accessed by users 112a . . . 112n (also referred to individually and collectively as 112) as illustrated by signal lines 110a . . . 110n. The intermediary server 116 may be coupled to the network 102 via signal line 114. The server 122 may be coupled to the network 102 via signal line 120. The use of the nomenclature "a" and "n" in the reference numbers indicates that any number of those elements having that nomenclature may be included in the system 100.

The network 102 may include any number of networks and/or network types. For example, the network 102 may include, but is not limited to, one or more local area networks (LANs), wide area networks (WANs) (e.g., the Internet), virtual private networks (VPNs), mobile networks (e.g., the cellular network), wireless wide area network (WWANs), Wi-Fi networks, WiMAX® networks, Bluetooth® communication networks, peer-to-peer networks, other interconnected data paths across which multiple devices may communicate, various combinations thereof, etc. Data transmitted by the network 102 may include packetized data (e.g., Internet Protocol (IP) data packets) that is routed to designated computing devices coupled to the network 102. In some embodiments, the network 102 may include a combination of wired and wireless (e.g., terrestrial or satellite-based transceivers) networking software and/or hardware that interconnects the computing devices of the system 100. For example, the network 102 may include packet-switching devices that route the data packets to the various computing devices based on information included in a header of the data packets.

The data exchanged over the network 102 can be represented using technologies and/or formats including the hypertext markup language (HTML), the extensible markup language (XML), JavaScript Object Notation (JSON), Comma Separated Values (CSV), etc. In addition, all or some of links can be encrypted using conventional encryption technologies, for example, the secure sockets layer (SSL), Secure HTTP (HTTPS) and/or virtual private networks (VPNs) or Internet Protocol security (IPsec). In another embodiment, the entities can use custom and/or dedicated data communications technologies instead of, or in addition to, the ones described above. Depending upon the embodiment, the network 102 may also include links to other networks.

The client devices 106 are computing devices having data processing and communication capabilities. While FIG. 1 illustrates two client devices 106, the present specification applies to any system architecture having one or more client devices 106. In some embodiments, a client device 106 may include a processor (e.g., virtual, physical, etc.), a memory, a power source, a network interface, and may include other components whether software or hardware, such as a display, graphics processor, wireless transceivers, keyboard, camera, sensors, firmware, operating systems, drivers, various physical connection interfaces (e.g., USB, HDMI, etc.). The client devices 106a . . . 106n may couple to and communicate with one another and the other entities of the system 100 via the network 102 using a wireless and/or wired connection.

Examples of client devices 106 may include, but are not limited to, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. While two or more client devices 106 are depicted in FIG. 1, the system 100 may include any number of client devices 106. In addition, the client devices 106a . . . 106n may be the same or different types of computing devices. In the illustrated embodiment, the client devices 106a . . . 106n respectively contain instances 109a . . . 109n of a native-client 109 (also referred to individually and collectively as native-client 109). The native-client 109 may be storable in a memory and executable by a processor of a client device 106. In some embodiments, the client device 106 may also include applications for making phone calls, video calls, messaging, social networking, gaming, capturing digital video, and/or images, authoring documents, etc.

The intermediary server 116 may include one or more computing devices having data processing, storing, and communication capabilities. For example, the intermediary server 116 may include one or more hardware servers, server arrays, storage devices, systems, etc., and/or may be centralized or distributed/cloud-based. In some embodiments, the intermediary server 116 may include one or more virtual servers, which operate in a host server environment and access the physical hardware of the host server including, for example, a processor, memory, storage, network interfaces, etc., via an abstraction layer (e.g., a virtual machine manager). In one embodiment, the intermediary server 116 includes a cache 184 for storing files. For example, an encrypted file, such as Encrypted File A 126a, may have a first copy 126a1 stored on the server 122 and a second copy 126a2 stored in the cache 184 of the intermediary server 116 when a Encrypted File A is sent to the client device 106 from the server 122 over an unsecured connection (e.g. HTTP).

Depending on the embodiment, the intermediary server 116 may be a proxy server, an accelerator, an intranet server, a Content Delivery Network (CDN) or any other computing device or group of computing devices that caches copies of files requested by client devices 106 from servers such as server 122 across a network 102. Such caching may beneficially allow subsequent requests for the same file to be answered by the intermediary server 116 returning a cached copy of the file, thereby decreasing the load on the network 102, the hits to the server 122 (which may save the operator of server 122 money due to lower bandwidth consumption)

and provides the file to the client more quickly than if the request had to travel to and be answered by the server 122.

It should be understood that the system 100 illustrated in FIG. 1 is representative of an example system for secure file transfer according to one embodiment and that a variety of different system environments and configurations are contemplated and are within the scope of the present disclosure. For instance, various functionality may be moved from a server to a client, or vice versa and some embodiments may include additional or fewer computing devices, services, and/or networks, and may implement various functionality client or server-side. Further, various entities of the system 100 may be integrated into to a single computing device or system or additional computing devices or systems, etc.

Figure 2:
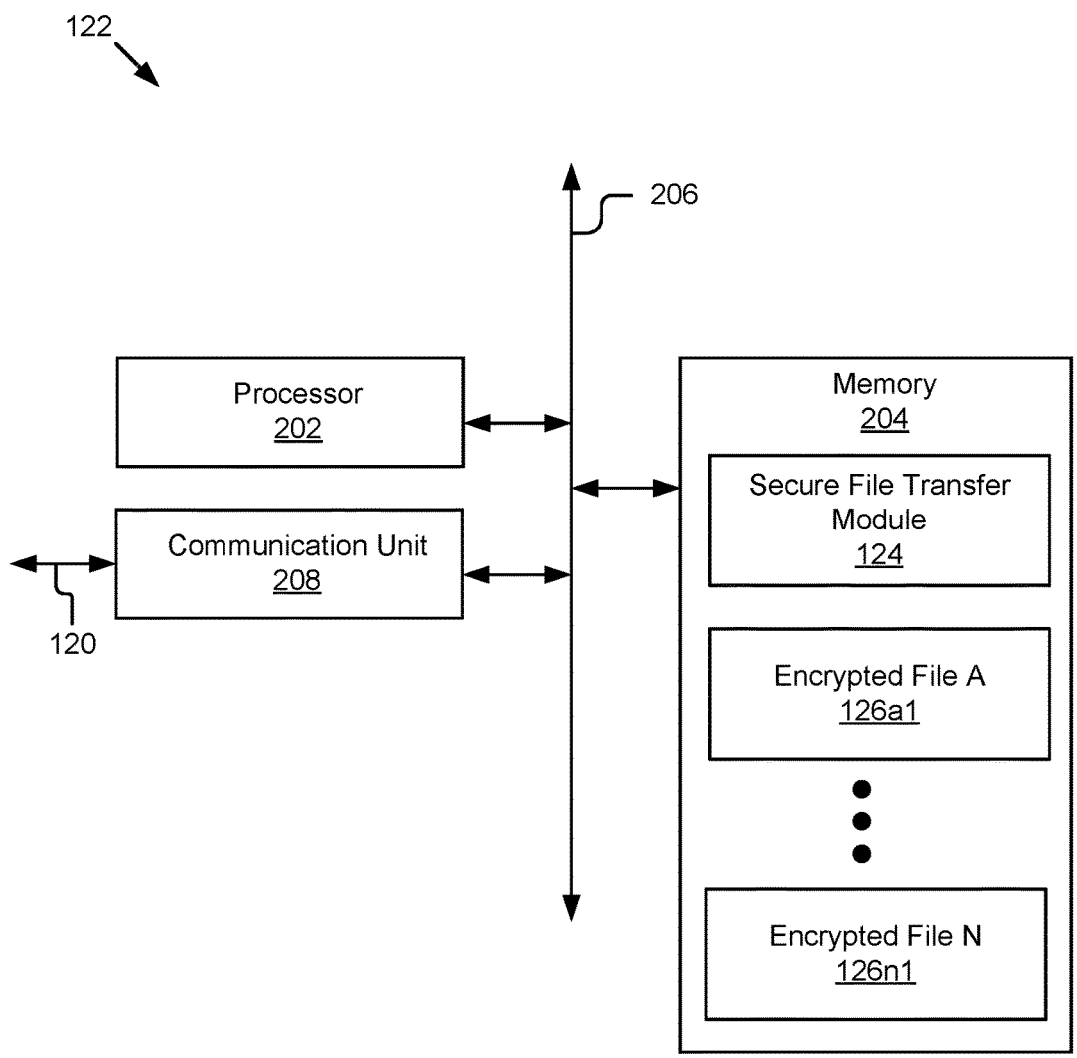
FIG. 2 is a block diagram illustrating an example server according to one embodiment.

FIG. 2 is a block diagram of an example server 122 according to one embodiment. The server 122, as illustrated, may include a processor 202, a memory 204 and a communication unit 208, which may be communicatively coupled by a communications bus 206. The server 122 depicted in FIG. 2 is provided by way of example and it should be understood that it may take other forms and include additional or fewer components without departing from the scope of the present disclosure. For example, while not shown, the server 122 may include a storage device, input and output devices (e.g., a display, a keyboard, a mouse, touch screen, speakers, etc.), various operating systems, sensors, additional processors, and other physical configurations. Additionally, it should be understood that the computer architecture depicted in FIG. 2 and described herein can be applied to multiple entities in a system 100, 500, 600A, 600B with various modifications, including, for example, the intermediary server 116 (e.g. by omitting the secure file transfer module 124 and including a cache 184) and a client device 106 (e.g. by omitting the secure file transfer module 124 and including a native client 109).

The processor 202 may execute code, routines and software instructions by performing various input/output, logical, and/or mathematical operations. The processor 202 have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single core or plurality of processing units and/or cores. In some embodiments, the processor 202 may be capable of generating and providing electronic display signals to a display device (not shown), supporting the display of images, capturing and transmitting images, performing complex tasks including various types of feature extraction and sampling, etc. In some embodiments, the processor 202 may be coupled to the memory 204 via the bus 206 to access data and instructions therefrom and store data therein. The bus 206 may couple the processor 202 to the other components of the server 122 including, for example, the memory 204 and communication unit 208.

The memory 204 may store and provide access to data to the other components of the server 122. In some embodiments, the memory 204 may store instructions and/or data that may be executed by the processor 202. For example, as depicted, the memory 204 may store the secure file transfer module 124 and encrypted files 126$a$1-126$n$1. The memory 204 is also capable of storing other instructions and data, including, for example, an operating system, hardware drivers, other software applications, databases, etc. The memory 204 may be coupled to the bus 206 for communication with the processor 202 and the other components of the server 122.

The memory 204 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 202. In some embodiments, the memory 204 may include one or more of volatile memory and non-volatile memory. For example, the memory 204 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory 204 may be a single device or may include multiple types of devices and configurations.

The bus 206 can include a communication bus for transferring data between components of a server 122 or between computing devices 106/116/122, a network bus system including the network 102 or portions thereof, a processor mesh, a combination thereof, etc. In some embodiments, the secure file transfer module 124, its sub-components 322, 324, 326, 328, 330, 332 and various other software operating on the server 122 (e.g., an operating system, device drivers, etc.) may cooperate and communicate via a software communication mechanism implemented in association with the bus 206. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 208 may include one or more interface devices (I/F) for wired and/or wireless connectivity with the network 102. For instance, the communication unit 208 may include, but is not limited to, CAT-type interfaces; wireless transceivers for sending and receiving signals using radio transceivers (4G, 3G, 2G, etc.) for communication with the mobile network 102, and radio transceivers for Wi-Fi™ and close-proximity (e.g., Bluetooth®, NFC, etc.) connectivity, etc.; USB interfaces; various combinations thereof; etc. In some embodiments, the communication unit 208 can link the processor 202 to the network 102, which may in turn be coupled to other processing systems. The communication unit 208 can provide other connections to the network 102 and to other entities of the system 100, 500, 600A, 600B using various standard network communication protocols, including, for example, those discussed elsewhere herein.

In some embodiments, a storage device (not shown) may also be included. A storage device is an information source for storing and providing access to data. In some embodiments, the storage device may be coupled to the components 202, 204, and 208 of the computing device via the bus 206 to receive and provide access to data. In some embodiments, the storage device may store the encrypted files 126$a$1-126$n$1 and provide access to the encrypted files 126$a$1-126$n$1 according to the description below.

The storage device (not shown) may be included in the server 122 and/or a storage system distinct from but coupled to, or accessible by, the server 122. The storage device can include one or more non-transitory computer-readable mediums for storing the data. In some embodiments, the storage device may be incorporated with the memory 204 or may be distinct therefrom. In some embodiments, the storage device may include a database management system (DBMS) operable on the server 122. For example, the DBMS could include a structured query language (SQL) DBMS, a NoSQL DMBS, various combinations thereof, etc. In some instances, the DBMS may store data in multi-dimensional tables comprised of rows and columns, and manipulate, i.e., insert, query, update and/or delete, rows of data using programmatic operations.

As mentioned above, the server 122 may include other and/or fewer components. Examples of other components may include a display, an input device, a sensor, etc. (not shown). In one embodiment, the server 122 includes a display. The display may display electronic images and data for presentation to a user 112. The display may include any conventional display device, monitor or screen, including, for example, an organic light-emitting diode (OLED) display, a liquid crystal display (LCD), etc. In some embodiments, the display may be a touch-screen display capable of receiving input from a stylus, one or more fingers of a user 112, etc. For example, the display may be a capacitive touch-screen display capable of detecting and interpreting multiple points of contact with the display surface.

The input device (not shown) may include any device for inputting information into the server 122. In some embodiments, the input device may include one or more peripheral devices. For example, the input device may include a keyboard (e.g., a QWERTY keyboard or keyboard in any other language), a pointing device (e.g., a mouse or touchpad), microphone, an image/video capture device (e.g., camera), etc. In some embodiments, the input device may include a touch-screen display capable of receiving input from the one or more fingers of the user 112. For example, the user 112 could interact with an emulated (i.e., virtual or soft) keyboard displayed on the touch-screen display by using fingers to contacting the display in the keyboard regions.

Example Secure File Transfer Module 124

Figure 3:
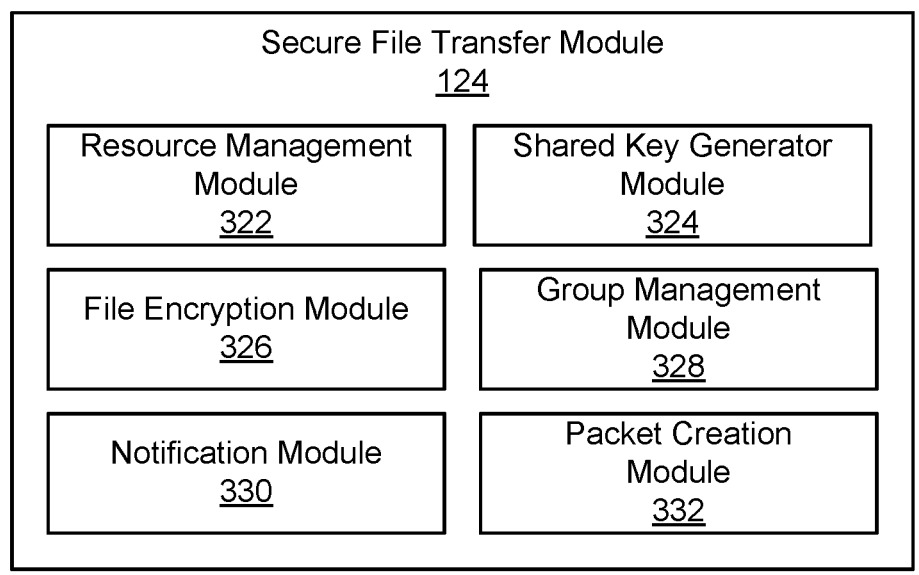
FIG. 3 is a block diagram of a secure file transfer module according to one embodiment.

Referring now to FIG. 3, the secure file transfer module 124 is shown in more detail according to one embodiment. FIG. 3 is a block diagram of the secure file transfer module 124 included in a server 122 according to one embodiment.

The secure file transfer module 124 provides secure file transfer. In one embodiment, the secure file transfer module 124 provides secure file transfer by encrypting a file to be shared with a group, by providing a packet of information used for locating and decrypting that file over a secure connection to members of that group and by, responsive to a request for the encrypted file, providing the encrypted file over an unsecured connection that performs caching of the encrypted file.

In one embodiment, the secure file transfer module 124 comprises a resource management module 322, a shared key generator module 324, a file encryption module 326, a group management module 328, a notification module 330 and a packet creation module 332. It will be recognized that the modules 322, 324, 326, 328, 330, 332 comprised in the secure file transfer module 124 are not necessarily all on the same server 122. In one embodiment, the modules 322, 324, 326, 328, 330, 332 and/or their functionality are distributed across multiple servers 122 and/or other computing devices. For example, FIGS. 5, 6A and 6B disclose systems 500, 600A and 600B, respectively, that include a notification server 142 and the notification module 330 is included therein.

The resource management module 322 includes code and routines for determining the existence of a new file. In one embodiment, the resource management module 322 is a set of instructions executable by the processor 202. In another embodiment, the resource management module 322 is stored in the memory 204 and is accessible and executable by the processor 202. In either embodiment, the resource management module 322 is adapted for cooperation and communication with the processor 202, other components of the server 122 and other components of the secure file transfer module 124.

A new file as used herein may include one or more of a newly created file and an updated or revised, existing file. A file is a collection of data treated as a unit. Examples of files may include, but are not limited to, one or more of documents, images, animations, spreadsheets, videos, text, audio, etc. It will be recognized that the preceding are merely examples of files and that other files exist and that files may have various formats. For clarity and convenience, this description uses a Human Resource (HR) document including salary information and social security numbers of Company A's employees as an example of a file. This example is merely one of many possible and has been selected because one expects that the employees and Company A would not want this file generally accessible; however, the HR document may need to be accessed by multiple individuals in the HR department.

The resource management module 322 determines the existence of a new file. In some embodiments, the resource management module 322 determines a file is new implicitly. For example, in some embodiments, the resource management module 322 automatically determines that a new file exists when it detects that a file is saved or uploaded (e.g. by HTTP POST) to the server 122. In some embodiments, the resource management module 322 determines a file is new explicitly. For example, in some embodiments, the resource management module 322 may perform analysis of metadata such as examining a version, last modified date, hash, author, etc. associated with the file to determine whether a new file exists. It should be recognized that the preceding are merely examples of determining the existence of a new file and that other examples exist and may be used without departing from the disclosure herein.

In one embodiment, the resource management module 322 alerts one or more of the shared key generator module 324 and the group management module 328 of the existence of the new file. In one embodiment, the resource management module 322 requests that the file encryption module 326 retrieve the new file. In one embodiment, the resource management module 322 passes the new file to the file encryption module 326. In one embodiment, the resource management module 322 stores the new file in the memory 204 (or any other non-transitory storage medium communicatively accessible (e.g. a storage device)). The other modules of the secure file transfer module 124 including, e.g., the file encryption module 326, may retrieve the new file by accessing the memory 204 (or other non-transitory storage medium).

The shared key generator module 324 includes code and routines for generating an encryption key for the new file. In one embodiment, the shared key generator module 324 is a set of instructions executable by the processor 202. In another embodiment, the shared key generator module 324 is stored in the memory 204 and is accessible and executable by the processor 202. In either embodiment, the shared key generator module 324 is adapted for cooperation and communication with the processor 202, other components of the server 122 and other components of the secure file transfer module 124.

The shared key generator module 324 generates an encryption key. In some embodiments, the shared key generator 326 may generate a key pair including a first key used by the file encryption module 326 to encrypt the new file and a second key for decrypting the file, which is included in a packet, discussed below, that is sent to group members over a secure connection. However, for clarity and convenience, the description herein discusses an embodiment in which a single key both encrypts the file and decrypts the file. The encryption key is occasionally referred to as the "shared key" because, in one embodiment, the encryption key is made available to, or shared with, members of a group with whom the file is to be shared. For example, the shared key is a symmetric key that is shared with group members in a packet over a secure communication channel as described below.

In one embodiment, the shared key is group specific. For example, assume a group is the HR department of Company A and the members of the group are the employees of the HR department; in one embodiment, the shared key generator module 324 generates a shared key which is used by the file encryption module 326, discussed below, to encrypt a file each time a file is to be shared with the HR department using secure file transfer.

In one embodiment, the shared key is file specific. For example, in one embodiment, each time a new file is determined to exist by the resource management module 322, the shared key generator module 324 generates a new shared key for that file and the file encryption module 326 encrypts that new file using that new shared key.

In one embodiment, the shared key generator module 324 passes the shared key to one or more of the file encryption module 326 and the packet creation module 332. In one embodiment, the shared key generator module 324 stores the shared key in the memory 204 (or any other non-transitory storage medium communicatively accessible, e.g., a storage device). The other modules of the secure file transfer module 124 including, e.g., the file encryption module 326 and/or the packet creation module 332, can retrieve the shared key by accessing the memory 204 (or other non-transitory storage medium).

The file encryption module 326 includes code and routines for encrypting the new file using the shared key. In one embodiment, the file encryption module 326 is a set of instructions executable by the processor 202. In another embodiment, the file encryption module 326 is stored in the memory 204 and is accessible and executable by the processor 202. In either embodiment, the file encryption module 326 is adapted for cooperation and communication with the processor 202, other components of the server 122 and other components of the secure file transfer module 124.

The file encryption module 326 encrypts the new file. The file encryption module 326 obtains the new file. For example, depending on the embodiment, the file encryption module 326 may receive the new file from the resource management module 322 or retrieve the new file from the memory 204 or any other non-transitory storage medium or source.

The file encryption module 326 obtains the shared key, and the file encryption module 326 encrypts the new file using the shared key. The file encryption module 326 subsequent to encrypting the new file publishes the encrypted file. Publishing the encrypted file makes the encrypted file available for retrieval by client devices 106 over an unsecured communication channel. For example, in one embodiment, upon publication, the encrypted file is sent to a requesting client device 106 responsive to receiving an HTTP GET identifying the encrypted file. Depending on the embodiment, the new (unencrypted) file may be removed from memory 204.

In one embodiment, the file encryption module 326 publishes the encrypted file to the server 122. For example, in one embodiment, the file encryption module 326 stores the encrypted file in the memory 204 (or any other non-transitory storage medium communicatively accessible, e.g., a storage device) of the server 122. The encrypted file may be published and distributed broadly while maintaining the security of the file, since the file is encrypted and only usable by those with the shared key and the shared key is only shared with authorized group members. In some embodiments, it may be desirable to publish the encrypted file broadly (e.g. to reduce load on the server 122). For example, in one embodiment, the file encryption module 326 publishes the encrypted file to other devices and/or service (not shown). For example, in one embodiment, the file encryption module 326 publishes the encrypted file to a peer-to-peer (P2P) file sharing service.

The group management module 328 includes code and routines for managing one or more groups. In one embodiment, the group management module 328 is a set of instructions executable by the processor 202. In another embodiment, the group management module 328 is stored in the memory 204 and is accessible and executable by the processor 202. In either embodiment, the group management module 328 is adapted for cooperation and communication with the processor 202, other components of the server 122 and other components of the secure file transfer module 124.

A group may include one or more members that are intended to have access to the contents of the encrypted file (i.e. receive the shared key and be able to unencrypt the encrypted file). Depending on the embodiment, the members of the group may include one or more users 112 and/or one or more client devices 106. In one embodiment, each group member is associated with a Globally Unique Identifier (GUID). In one embodiment, a group is represented by a collection of the GUIDs associated with the members of that group.

The group management module 328 manages one or more groups. In one embodiment, managing a group may include one or more of creating and removing groups, determining members of a group, adding and removing members from a group and determining a group associated with a new and/or encrypted file. For example, assume the new file is the HR document with sensitive information such as the salary information and social security numbers of employees, which was encrypted by the file encryption module 326. Also, assume that access to the sensitive information should be restricted to employees in the HR department of the company. In one embodiment, the group management module 328 creates a "Human Resource" group, adds the employees of the Human Resource department to that group and determines the "Human Resource" group is associated with an encrypted file containing the Human Resource document. In one embodiment, the group management module 328 receives user input creating a group and identifying members to be included in that group, and the group management module 328 creates the group with the identified members and associates that group with the encrypted file. For example, the group management module 328 responsive to receiving user input creates a list (or other data structure) and stores the GUIDs associated with the group members identified by user input and associates that list with the encrypted file.

Depending on the embodiment, a group may be persistent or file specific. In one embodiment, a group and its membership are file specific. For example, in one embodiment, each time a file is to be shared using secure file transfer, a group is defined by identifying members. In one embodiment, a group and its membership are persistent. For example, in one embodiment, each time a file is to be shared using secure file transfer, a previously created group, or groups, with predefined members stored by the server 122 may be identified.

In some embodiments, the group management module 328 sends a notification request. A notification request is a message that requests that each group member receive a notification to establish a secure connection with the server 122 to receive a packet created by the packet creation module 332 discussed below. In one embodiment, the notification request identifies the group members. For example, in one embodiment, the group management module 328 sends a notification request including the GUIDs associated with the members to be notified. In one embodiment, the group management module 328 does not send a notification request until the encryption module 326 has encrypted and published the file. In some embodiments, no notification is provided and the notification module 330 may be omitted. For example, in one embodiment, the native client 109 may periodically poll the server 122 to determine whether a new file is available and if one is, establish a secure connection to receive the packet.

In one embodiment, the group management module 328 passes the notification request to the notification module 330. For example, the group management module 328 is communicatively coupled to the notification module 330 to send the notification request to the notification module 330. In another embodiment, the group management module 328 stores the notification message in the memory 204 (or any other non-transitory storage medium communicatively accessible (e.g. storage device)), and the notification module 330 may retrieve the notification message by accessing the memory 204 (or other non-transitory storage medium).

The notification module 330 includes code and routines for sending a notification. In one embodiment, the notification module 330 is a set of instructions executable by the processor 202. In another embodiment, the notification module 330 is stored in the memory 204 and is accessible and executable by the processor 202. In either embodiment, the notification module 330 is adapted for cooperation and communication with the processor 202, other components of the server 122 and other components of the secure file transfer module 124.

A notification is a message that when received by the native client 109 prompts an action at the client device 106, for example, the creation of a secure connection between the client device 106 and the server 122. In some embodiments, the notification may be transparent to the user 112 of the client device 106. For example, in one embodiment, the native-client 109 receives the notification and automatically initiates a secure connection to the server 122 (e.g. using HTTPS) to receive the packet without any intervention by or notice to the user 112. In some embodiments, the notification may be presented to the user 112 of the client device 106 and require user 112 input. For example, in one embodiment, the notification may be a message presented by the native client 109 on the client devices 106 display and requesting that the user select a secure link, submit credentials, or take some other action.

The notification module 330 sends notifications. In one embodiment, the notification module 330 passes a notification to a client devices 106 that is, or is associated with, a group member identified by the group management module 328. For example, the notification module 330 receives GUIDs of group members and sends a notification to the client device 106 associated with that GUID. In one embodiment, the notification module 330 sends the same notification regardless of what group a member belongs to. Such an embodiment may be advantageous in the context of a notification server 142 discussed below with reference to FIGS. 5-7, because the notification module 330 need not use resources tracking what GUIDs belong to what group and receive what message. Instead, the notification server 330 may, in some embodiments, send the same notification to each client device 106 associated with a GUID received from the group management module 328.

The packet creation module 332 includes code and routines for creating a packet. In one embodiment, the packet creation module 332 is a set of instructions executable by the processor 202. In another embodiment, the packet creation module 332 is stored in the memory 204 and is accessible and executable by the processor 202. In either embodiment, the packet creation module 332 is adapted for cooperation and communication with the processor 202, other components of the server 122 and other components of the secure file transfer module 124.

The packet creation module 332 creates a packet. The packet may occasionally be referred to herein as the "secure packet." In one embodiment, a packet includes an encryption key and a file identifier. For example, the packet includes a shared encryption key and a uniform resource location (URL) for the encrypted file associated with that shared encryption key. As this packet includes the encryption key used to unencrypt the identified encrypted file, in one embodiment, this packet is distributed only to members of the group intended to have access to the contents of the file and is distributed only over a secure connection/communication channel. For example, responsive to receiving the notification message, in one embodiment, the client device 106 initiates an HTTPS connection with the server 122, and upon verifying that the client device 106 is, or is associated with, a group member with whom the file should be shared, the packet is transmitted over the HTTPS connection.

Depending on the embodiment, the packet creation module 332, the group management module 328 or a combination of the two may be responsible for determining that a secure connection is associated with a group member, identifying the packet associated with that group and sending the packet over the secure connection to the client device 106. For example, in one embodiment, the packet creation module 332 obtains a list of GUIDs associated with an encrypted file from the group management module 328, the URL of that encrypted file from the file encryption module 326 and the encryption key for that encrypted file from the shared key generator module 324. In one embodiment, when a secure connection is created, the packet creation module 332 receives a GUID from the client device 106, compares the GUID from the client device 106 with the GUIDs obtained from the group management module 328. When a match is found, the packet creation module 332 sends a packet including the URL and encryption key for the encrypted file associated with the group that includes the matching GUID to the client device 106 according to one embodiment.

In one embodiment, after the encrypted file A 126a1 is published, the encrypted file may be requested by client devices 106. For example, after publication, the encrypted file may be requested and obtained by a client device 106 (i.e. a requestor) using an HTTP GET. In one embodiment, the encrypted file is associated with one or more caching headers (e.g., cache control, expires, max-age, last modified, etags, etc.) and a copy 126a2 is cached en route between the server 122 and client device 106. Since the encrypted file is encrypted and access to the encryption key for decrypting file is controlled as described above, in some embodiments, no verification that the requestor of an encrypted file is a group member is performed. A subsequent HTTP GET from another requestor may result in obtaining encrypted file 126a2 from the cache 184. For example, a client device 106a belonging to an HR employee sends a HTTP GET for the encrypted HR documents and obtains the encrypted file from the server 122. En route to the client device 106a, the HR document is cached in an intranet server (an example of an intermediary server 116) of Company A. Client device 106n (also belonging to an employee of the HR department) subsequently requests the HR document with an HTTP GET and receives the HR document from the intranet server realizing the benefits of caching.

Example Methods

Figure 4:
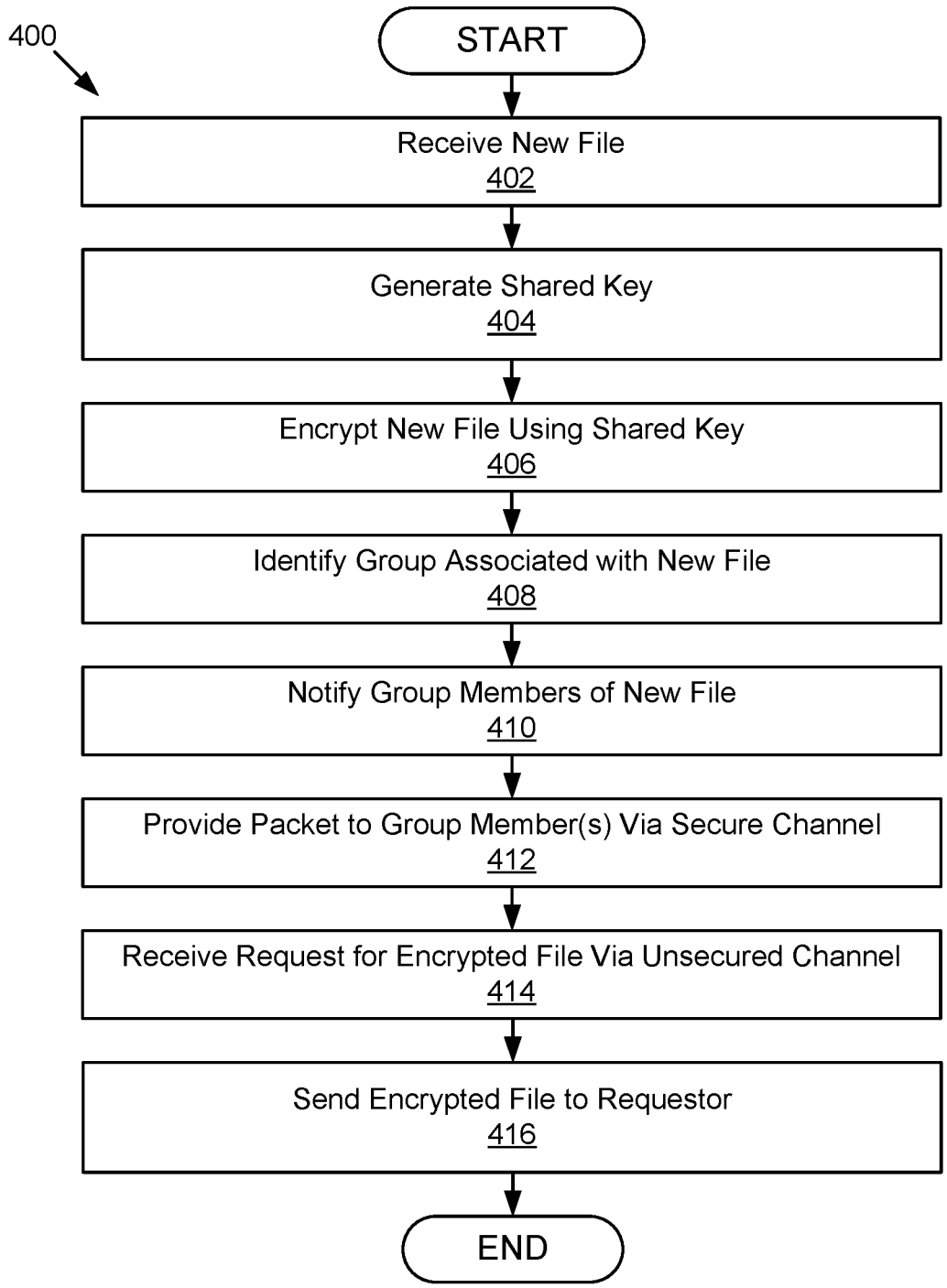
FIG. 4 is a flowchart of an example method for secure file transfer according to one embodiment.

FIG. 4 depicts method 400 performed by the system described above in reference to FIGS. 1-3. The method 400 begins at block 402. At block 402, the resource management module 322 receives a new file. At block 404, the shared key generator module 324 generates an encryption key. At block 406, the file encryption module 326 encrypts the new file with the encryption key generated at block 404. At block 408, the group management module 328 identifies the group associated with the new file and, at block 410, notifies the group members of the new file's existence. At block 412, the packet creation module 332 provides the packet to the group member(s) via the secure channel. At block 414, the server 122 receives a request for the encrypted file via an unsecure channel and sends, at block 416, the encrypted file to the requestor.

Example Embodiments Including a Notification Server 142

Figure 5:
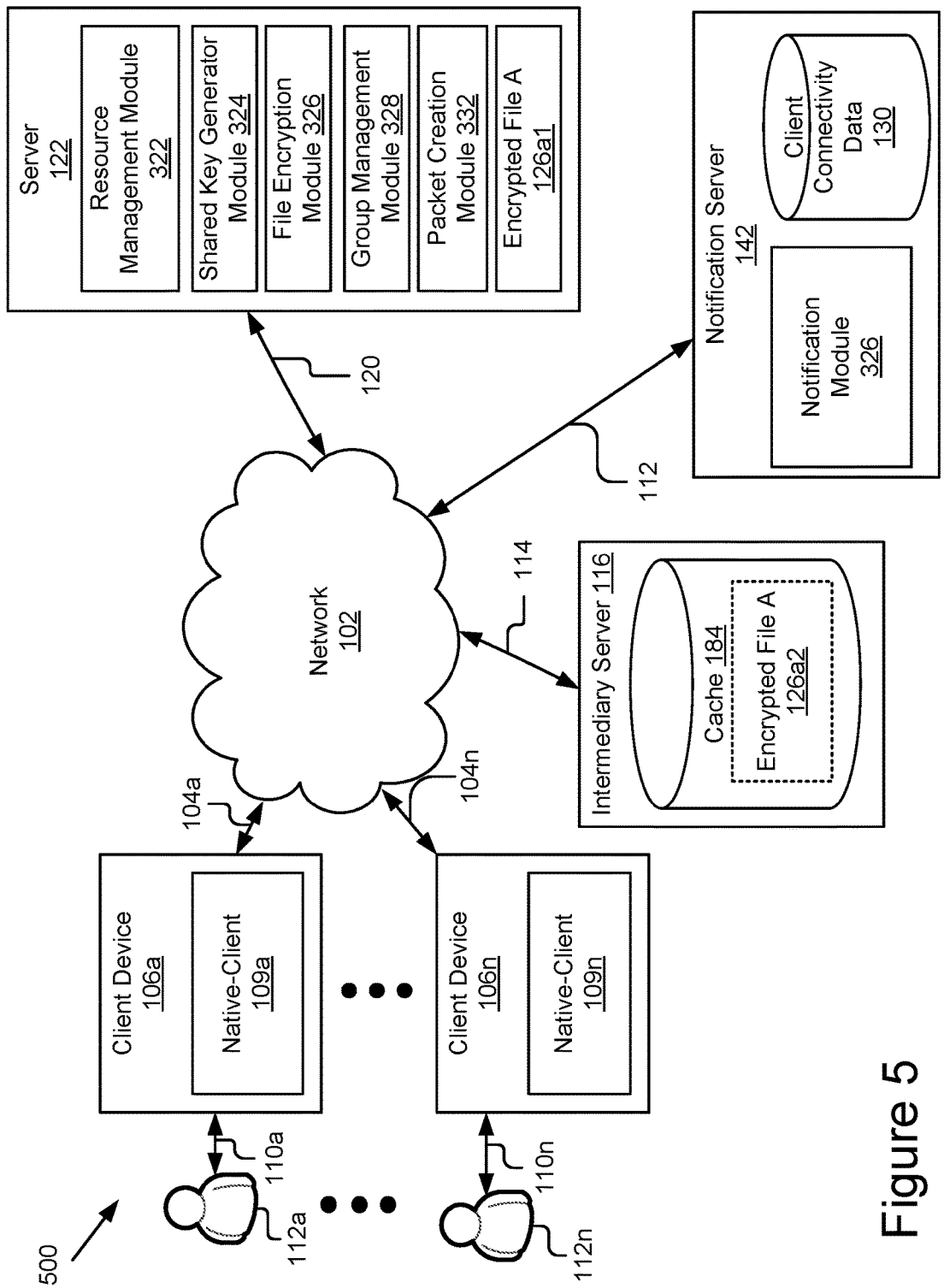
FIG. 5 is a block diagram illustrating an example system for secure file transfer including a notification server according to one embodiment.

FIG. 5 is a block diagram illustrating an example system for secure file transfer including a notification server according to one embodiment. As mentioned above, the system 100 of FIG. 1 is merely an example system for secure file transfer according to one embodiment. FIG. 5 illustrates another example of a system 500 for secure file transfer according to one embodiment. However, it will be recognized that still further system environments and configurations are contemplated and within the scope of the present disclosure.

The system 500 of FIG. 5 includes similar components to the system 100 of FIG. 1. Therefore, the description of the similar components will not be repeated herein. System 500 differs from system 100 primarily in the inclusion of a notification server 142 for sending notifications in system 500. In one embodiment, the notification server 142 includes the notification module 326.

The notification server 142 may include one or more computing devices having data processing, storing, and communication capabilities. For example, the notification server 142 may include one or more hardware servers, server arrays, storage devices, systems, etc., and/or may be centralized or distributed/cloud-based. In some embodiments, the notification server 142 may include one or more virtual servers, which operate in a host server environment and access the physical hardware of the host server including, for example, a processor, memory, storage, network interfaces, etc., via an abstraction layer (e.g., a virtual machine manager). In one embodiment, the notification server 142 stores and maintains client connectivity data 130, which may include an identifier (e.g. a GUID) associated with a client device 106 that has initiated and maintained a connection with the notification server 122. Benefits of embodiments using notifications and a notification server 142 are discussed below with reference to FIGS. 6A-B.

Figure 6A:
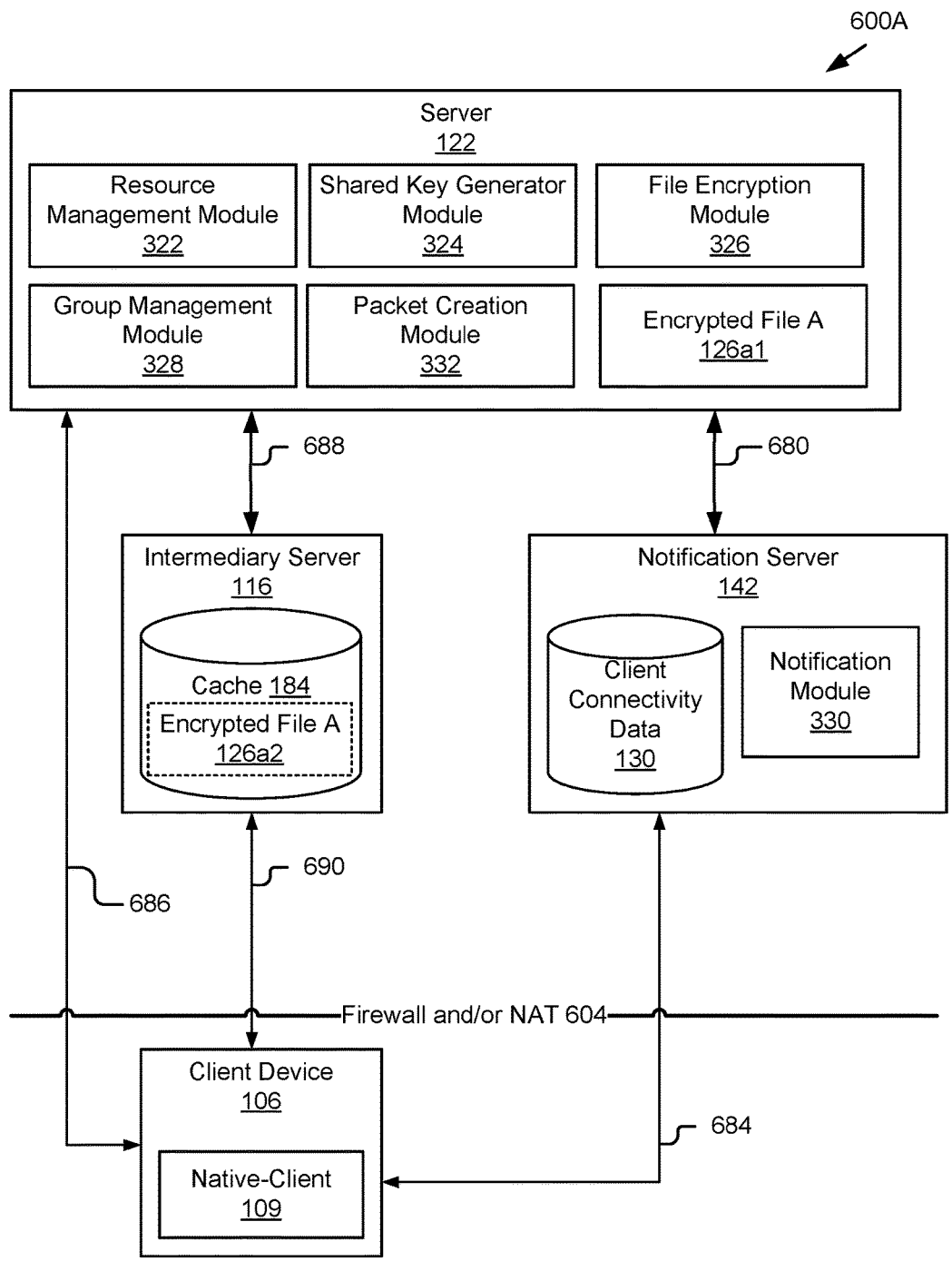
FIG. 6A is a block diagram of an example system for secure file transfer including a notification server according to one embodiment.

FIG. 6A is a block diagram illustrating an example system 600A for secure data transfer according to one embodiment. In the illustrated embodiment, the client device 106 is behind a network separation device as indicated by line 604. Examples of network separation devices include, but are not limited to, a firewall, a NAT and a combination thereof. For clarity and convenience, the description herein often refers to a firewall and/or NAT as the network separation device although others may exist. Because the client device 106 is behind a firewall and/or NAT 604, the server 122 may not initiate contact and communicate with the client device 106, because, for example, the firewall may prohibit the server 122 (which may be behind its own firewall and/or NAT (not shown)) from being aware of the client device's 106 existence behind the firewall and/or the NAT's address translation does not allow for a connection to a "known" port. For example, a firewall may prevent a server 122 from knowing there is a client device 106 to be notified and/or a NAT may prevent the server 122 from reliably notifying the client device 106 because the server 122 does not know what port 80, for example, on the client device 106 is translated to by the NAT.

In one embodiment, this issue is overcome using the notification server 142 as described below. In one embodiment, the notification server 142 may be a cloud-based server. As illustrated, the server 122 may communicatively couple to the intermediary server 116 and the notification server 142 as illustrated by signal lines 688 and 680, respectively; the notification server 142 may communicatively couple with the client device 106 as illustrated by signal line 684; and the client device 106 may communicatively couple to the intermediary server 116 as illustrated by signal line 690 and to the server 122 as illustrated by signal line 686.

In one embodiment, the connections 680, 684, 686, 688, 690 are established over the network 102 (e.g. including the Internet) and used as described below with reference to FIGS. 6B-8 and the methods 600B, 700 and 800 therein. For example, referring to FIGS. 6A&B, in one embodiment, the connection 684 between the client device 106 and the notification server 142 is established by the client device 106 sending an initialization request 606, maintained by keep-alive packets 608 and delivers a notification message 612. In another example, still referring to FIGS. 6A&B, the connection 686 is a secure connection between the client device 106 and the server 122 that is established by the client device 106 and used to securely request 614a-b a packet and securely receive 616a-b the requested packet. While the secure connection 686 is illustrated in FIG. 6A as a separate signal line bypassing the intermediary server 116, it will be recognized that a secure connection may be established through the intermediary server 116 and be used to carry the secure packet request 614a-b and secure packet 616a-b as illustrated in FIG. 6B.

It should be recognized that the methods 600B, 700 and 800 are merely examples and that other examples and embodiments exist. It should further be understood that the system 600A illustrated in FIG. 6A is representative of an example system for secure file transfer according to one embodiment and that a variety of different system environments and configurations are contemplated and are within the scope of the present disclosure. For instance, various functionality may be moved from a server to a client, or vice versa and some embodiments may include additional or fewer computing devices, services, and/or networks, and may implement various functionality client or server-side. Further, various entities of the system 600A may be integrated into to a single computing device or system or additional computing devices or systems, etc.

Example Methods for Embodiments Including a Notification Server 142

Figure 6B:
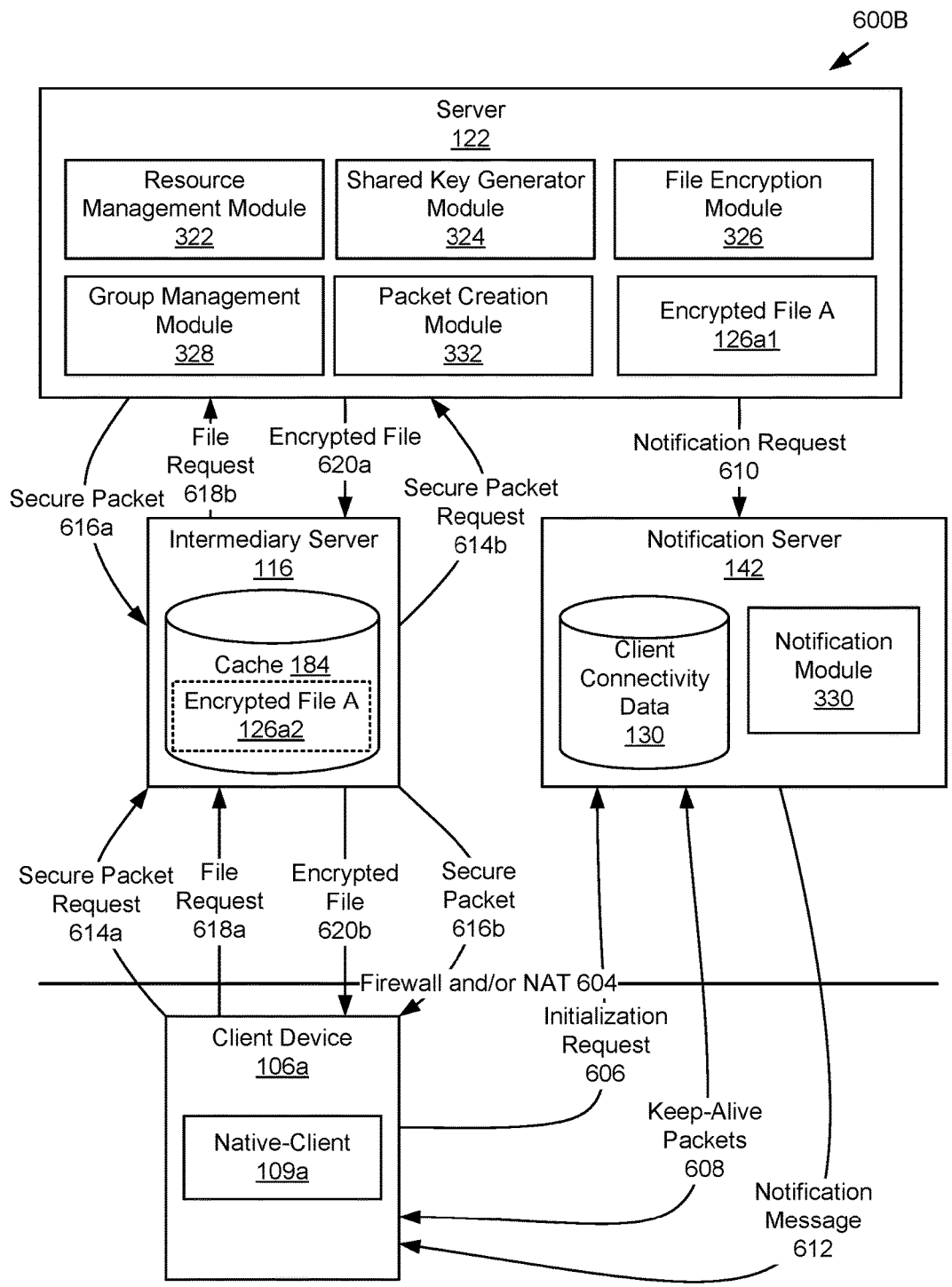
FIG. 6B is a block diagram illustrating an example system and method for secure file transfer and related communications according to one embodiment.
Figure 7:
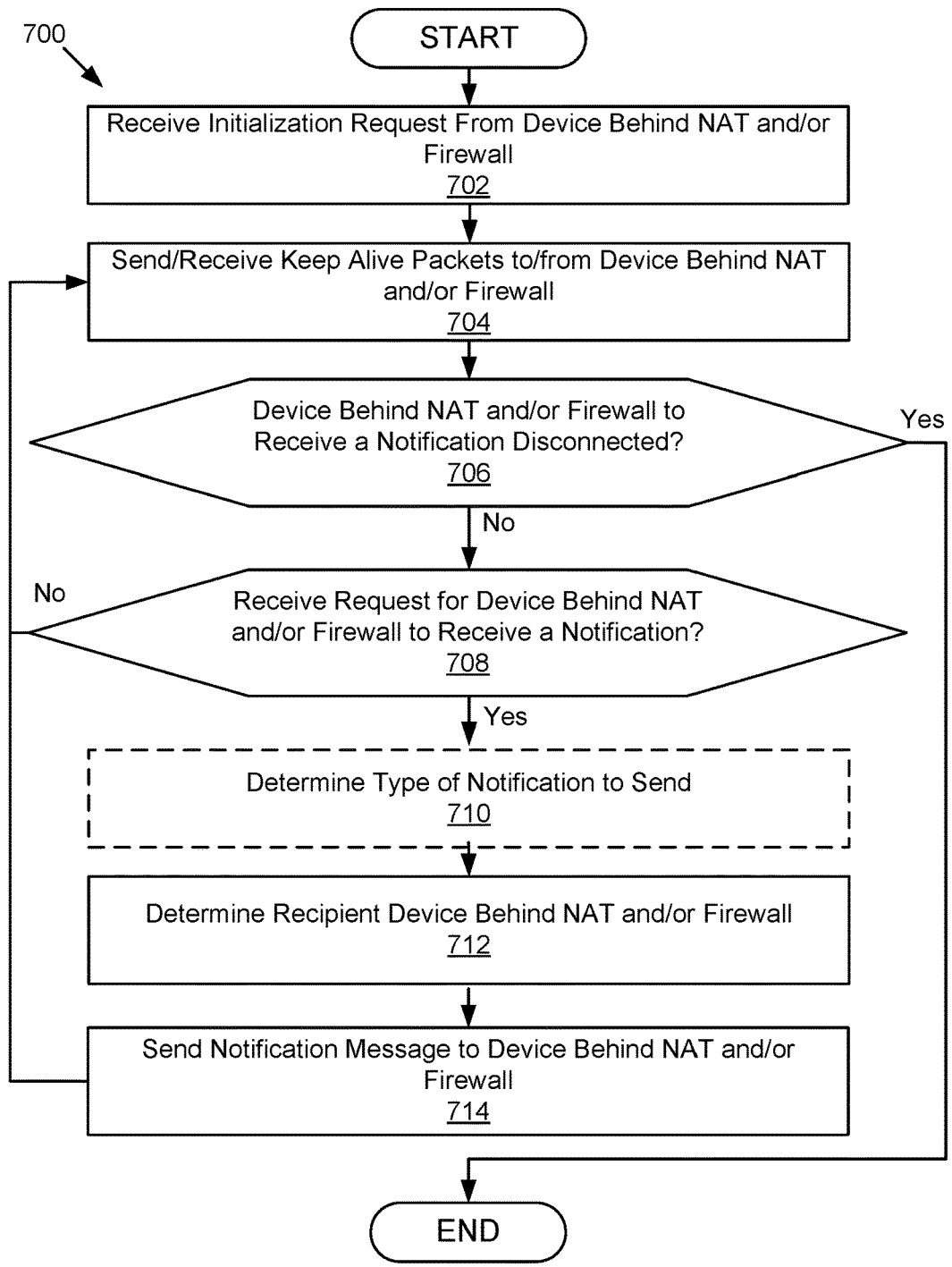
FIG. 7 is a flowchart of an example method for a notification server to notify a device behind a firewall and/or NAT to perform an action according to one embodiment.
Figure 8:
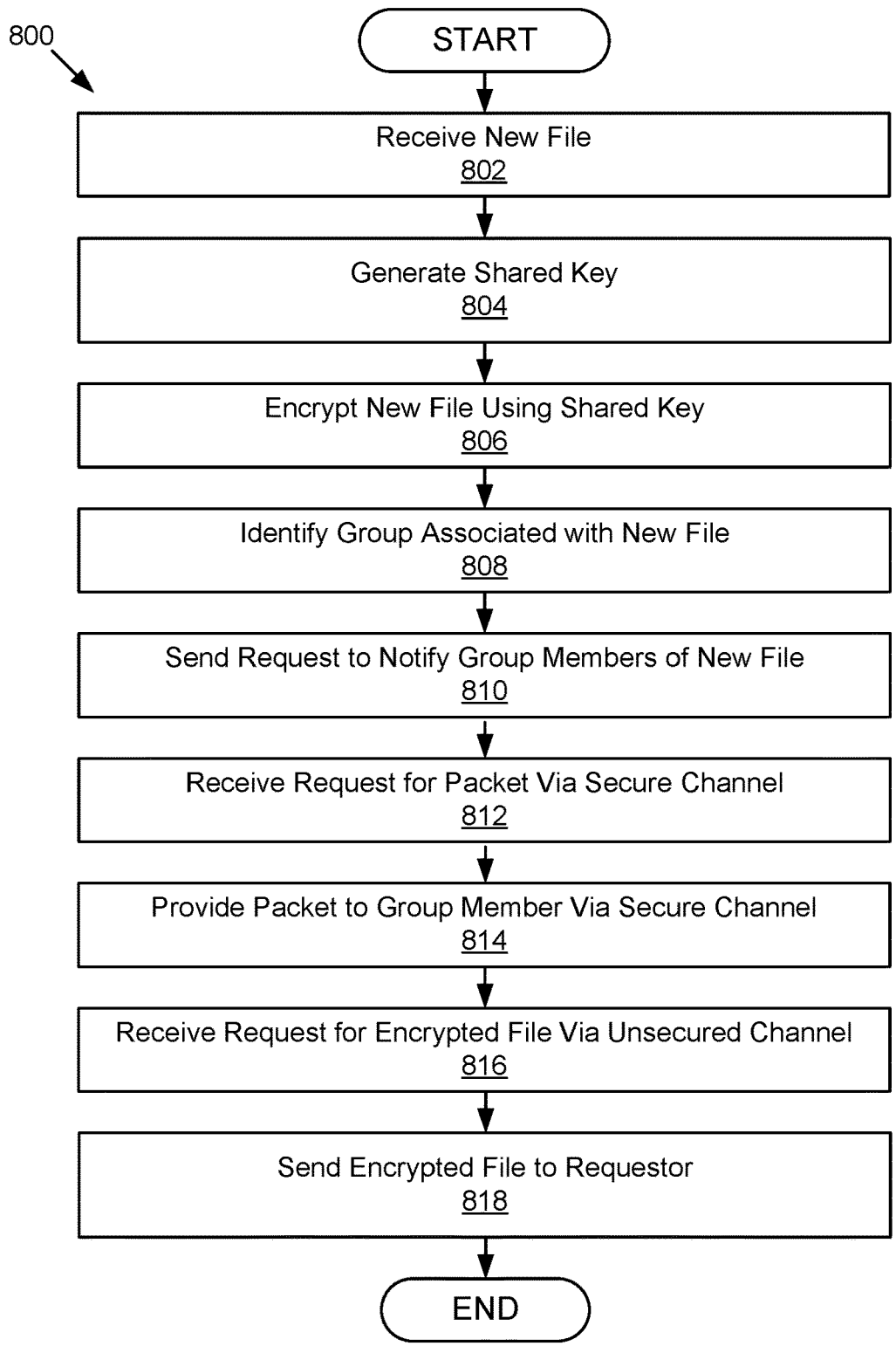
FIG. 8 is a flowchart of an example method for secure file transfer according to one embodiment.

FIGS. 6B-8 depict methods 600B, 700, 800 performed by the system described above in reference to FIGS. 5-6A. Referring to FIG. 6B an example method 600B for secure file transfer with references to system 600A is shown according to one embodiment. In the illustrated embodiment, the client device 106 sends an initialization request 606 to the notification server 142. In one embodiment, the initialization request 606 is sent by the client device 106 responsive to a determination by the client device 106. For example, upon start-up (or upon request by a user of the client device 106), the client device 106 determines that it is going to send an initialization request 606 to the notification server 142. In one embodiment, the initialization request 606 received from the client device 106 is used by the notification server 142 to register (not shown) the client device 106. In one embodiment, this registration is stored as client connectivity data 130 by the notification server 142. For example, the client connectivity data 130 includes a client ID of the client device 106 sending 606 the initialization request and the port(s) by which the notification server 142 is communicating with that client device 106. In one embodiment, the client connectivity data 130 is stored in the memory or storage device of the notification server 142.

It will be recognized that because of the NAT and/or firewall, the notification server 142 may not be able to initiate communication with the client device 106. However, since the client device 106 initiates the communication with the notification server 142, a hole is "punched" through the firewall and/or NAT 604 and the client device 106 and notification server 142 are able to communicate. The notification server 142 exchanges 608 keep-alive packets, occasionally referred to herein as a "heart beat," to maintain the connection through the firewall and/or NAT 604. In some embodiments, the keep-alive packets are exchanged periodically with a frequency sufficient to prevent time-out of the connection between the notification server 142 and the client device 106. For example, keep-alive packet may be sent every 15 seconds. It will be recognized that while the keep-alive packet exchange is illustrated as bidirectional between the client device 106 and the notification server 142, in some embodiments, the keep-alive packets may be unidirectional, for example, from client device 106 to notification server 142 or from notification server 142 to client device 106. Regardless, a connection 684 between the notification server 142 and client device 106 is maintained by the keep-alive packets.

At some point in time, in one embodiment, the resource management module 322 receives a new file (not shown); the new file is encrypted (not shown) by the file encryption module 326 using an encryption key generated (not shown) by the shared key generator module 324; the group management module 328 determines the group associated with the new file (not shown) and sends 610 a notification request to the notification server 142. In one embodiment, the notification request includes the one or more client IDs associated with the group members. In one embodiment, the client ID is a globally unique identifier (GUID) associated with the client device 106.

The notification server 142 determines (not shown) whether it is in communication with the identified client devices 106. For example, in one embodiment, the notification server 142 checks client connectivity data 130 (e.g. a list, table or other data structure) to see whether the identified client device 106 has registered with the notification server 142 and, if so, whether the notification server 142 still has a connection with the identified client device 106. Responsive to determining (not shown) that the notification server 142 has a connection with the client device 106 associated with a received client ID, the notification server 142 sends 612 a notification message to the client device 106 using the connection being maintained by the exchange 608 of keep-alive packets.

The client device 106 upon receiving the notification message knows a new file exists and initiates a secure connection with the server 122 thereby "punching" through the firewall and/or NAT so the client device 106 and the server 122 are able to communicate. The client device 106 uses the secure connection with the server 122 to send 614a-b a secure packet request to the server 122 and receive 616a-b a secure packet from the server 122. In the illustrated embodiment, the secure connection between the server 122 and the client device 106 includes the intermediary server 116. For example, in one embodiment, the intermediary server 116 may be a proxy server or Content Delivery Network located in the Internet between the server 122 and the client device 106, and the secure packet request 614a-b and secure packet 616a-b are exchanged using HTTPS.

The client device 106 sends a file request 618a-b (e.g. an HTTP GET) over an unsecured connection (e.g. HTTP) through the intermediary server 116, and receives 620a-b the encrypted via an unsecured connection. As illustrated, when the encrypted file (i.e. encrypted file A 126a1) is returned 620a-b to the client device 106 through the intermediary server 116. The intermediary server 116 stores a copy 126a2 of encrypted file A 126a, which may be used to respond to client devices 106 that subsequently request encrypted file A 126a. The client device 106 having received 616b the secure packet may decrypt and use the received 620b encrypted file (i.e. encrypted file A 126). It should be noted that while this description focuses on a client device 106 retrieving an encrypted file, in some embodiments, secure file transfer may be used to securely upload content from the client device 106 to the server 122.

FIG. 7 depicts an example method 700 performed by a notification server 142 to notify a device behind a firewall and/or NAT to perform an action according to one embodiment. In one embodiment, the notification server 142 may perform the method 700 to notify a client device 106 behind a NAT and/or firewall to initiate one or more communications channels with the server 122 as described with reference to FIG. 6B. However, it will be recognized that the notification server 142 and notifications may be used to notify or prompt a client device 106 behind a NAT and/or firewall to perform additional or other actions.

The illustrated method 700 begins at block 702. At block 702, the notification server 142 receives an initialization request from a device behind a NAT and/or firewall. At block 704, the notification server 142 sends keep alive packets to the device behind the NAT and/or firewall and/or receives keep alive packets from the device behind the NAT and/or firewall. At block 706, the notification module 330 of the notification server 142 determines whether the device behind the NAT and/or firewall has been disconnected.

When the notification module 330 determines that the device behind the NAT and/or firewall has been disconnected (706 Yes), the method 700 ends. When the notification module 330 determines that the device behind the NAT and/or firewall remains connected (706 No), the method continues at block 708. At block 708, the notification module 330 of the server 142 determines whether a request to notify a device behind the NAT and/or firewall has been received.

When the notification module 330 module determines that a request to notify a device behind the NAT and/or firewall has not been received (708 No), the method 700 continues at block 704 and blocks 704, 706 and 708 are repeated until a request to notify a device behind the NAT and/or firewall is received (708 Yes) or the device behind the NAT and/or firewall is disconnected (706 Yes). In other words, in one embodiment, after the device behind the NAT and/or firewall sends an initialization request registering with the notification server 142, that device and the notification server 142 exchange keep alive packets until a notification is requested and sent to the device or until the device disconnects.

When the notification module 330 module determines that a request to notify a device behind the NAT and/or firewall has been received (708 Yes), the method 700 continues at block 710 or 712 depending on the embodiment. In embodiments in which the notification module 330 may send multiple notification types (e.g. prompting the device behind the NAT and/or firewall to take different actions based on the notification type received), at block 710, the notification module 330 determines the type of notification requested before continuing to block 712. At block 712, the notification module 330 determines a recipient device behind the NAT and/or firewall that the notification server 142 is in communication with and sends, at block 714, the notification message to the device behind the NAT and/or firewall. The method then continues at block 704.

It will be recognized that the notification server 142 and the notification module 330 do not require the device to be behind a NAT and/or firewall in order to provide notifications to the device. Rather, the description of the device being behind a NAT and/or firewall is included to highlight the benefits of a notification server 142, i.e., that a device behind a NAT and/or firewall may be notified and that device may initiate actions which "punch" or "tunnel" through one or more network separation devices such as the NAT and/or firewall to the device to participate in actions and communications (e.g. secure file transfer), which may not otherwise be possible.

It will also be recognized that the notification module 330 does not necessarily have to determine the recipient device in order to provide notification. As described above, in some embodiments, the notification module 330 may broadcast the same notification regardless of what group a member belongs to. In this case, only the client devices 106 associated with a specific GUID can receive the secure packet 616b from the server 122 via intermediary server 116. Such embodiments may be beneficial because the notification module 330 need not use resources tracking what GUIDs belong to what group and receive what message.

FIG. 8 depicts method 800 performed by the system described above in reference to FIGS. 5-6B. The method 800 begins at block 802. At block 802, the resource management module 322 receives a new file. At block 804, the shared key generator module 324 generates an encryption key. At block 806, the file encryption module 326 encrypts the new file with the encryption key generated at block 804. At block 808, the group management module 328 identifies the group associated with the new file and sends, at block 810, a request to a notification server 142 to notify the group members of the new file's existence. At block 812, the packet creation module 332 receives a request for a packet from a group member via a secure channel. At block 814, the packet creation module 332 provides the packet to the group member via the secure channel. At block 816, the server 122 receives a request for the encrypted file via an unsecure channel and sends, at block 818, the encrypted file to the requestor.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various embodiments are described as having particular hardware, software, and user interfaces. However, the present disclosure applies to any type of computing device that can receive data and commands, and to any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

In some instances, various embodiments may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various embodiments described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware embodiment, an entirely software embodiment, or embodiments containing both hardware and software elements. For instance, the technology may be implemented in software, which includes but is not limited to firmware, resident software, microcode, etc.

Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the disclosure herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the disclosure of the specification as described herein.

The foregoing description has been presented for the purposes of illustration and description. It is not intended to be exhaustive or to limit the specification to the precise form disclosed. Many modifications and variations are possible in light of the above disclosure. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
   encrypting, using one or more computing devices, a file;
   sending, using the one or more computing devices, via a secure channel and separate from the encrypted file, a packet to a group having one or more members, the group authorized to access the encrypted file, the packet associated with the encrypted file and including access information for the encrypted file;
   receiving, using the one or more computing devices, a first request for the encrypted file from a first requestor; and
   sending, using the one or more computing devices, the encrypted file to the first requestor via an unsecured channel that performs caching of the encrypted file, wherein the first requestor is able to access the encrypted file using the packet when the first requestor is a member of the group authorized to access the encrypted file and received the packet via the secure channel and wherein the first requestor is unable to access the encrypted file when the first requestor is not a member of the group authorized to access the encrypted file.

2. The method of claim 1, further comprising:
   generating, before providing the packet to the group, the packet, the access information comprising identification of the encrypted file with which the packet is associated and a shared key for decrypting the encrypted file with which the packet is associated.

3. The method of claim 1, further comprising:
   sending a notification of an existence of the file to the first requestor, the first requestor located behind a network separation device.

4. The method of claim 3, wherein the file is a newly created file, the method including determining that the file is newly created and, responsive to determining that the file is newly created file, automatically sending the notification of the existence of the file.

5. The method of claim 3, wherein the file is a revised version of an existing file, the method including determining that the file is revised version of an existing file and, responsive to determining that the file is the revised version of the existing file, automatically sending the notification of the existence of the file.

6. The method of claim 3, further comprising:
subsequent to sending the notification of the file, establishing the secure channel for providing the packet to the first requestor located behind the network separation device.

7. The method of claim 1, wherein a copy of the encrypted file is obtained from a cache of the unsecured channel responsive to a second request for the encrypted file, the second request occurring subsequent to the first request for the encrypted file.

8. The method of claim 1, wherein the group includes one or more of a persistent group and a file specific group.

9. The method of claim 3, wherein the network separation device is one or more of a firewall and a network address translator.

10. A system, comprising:
one or more servers executing instructions that cause the one or more servers to:
encrypt a file;
send, via a secure channel and separate from the encrypted file, a packet to a group having one or more members, the group authorized to access the encrypted file, the packet associated with the encrypted file and including access information for the encrypted file;
receive a first request for the encrypted file from a first requestor; and
send the encrypted file to the first requestor via an unsecured channel that performs caching of the encrypted file, wherein the first requestor is able to access the encrypted file using the packet when the first requestor is a member of the group authorized to access the encrypted file and received the packet via the secure channel and unable to access the encrypted file when the first requestor is not a member of the group authorized to access the encrypted file.

11. The system of claim 10, wherein the one or more servers generate the packet before providing the packet to the group, the access information comprising identification of the encrypted file with which the packet is associated and a shared key for decrypting the encrypted file with which the packet is associated.

12. The system of claim 10, wherein the one or more servers send a notification of an existence of the file to the first requestor, the first requestor located behind a network separation device.

13. The system of claim 12, wherein the file is a newly created file, the one or more servers determining that the file is newly created and, responsive to determining that the file is newly created, automatically sending the notification of the existence of the file.

14. The system of claim 12, wherein the file is a revised version of an existing file, the one or more servers determining that the file is revised version of an existing file and, responsive to determining that the file is the revised version of the existing file, automatically sending the notification of the existence of the file.

15. The system of claim 12, wherein the one or more servers establish the secure channel for providing the packet to the first requestor located behind the network separation device subsequent to sending the notification of the existence of the file.

16. The system of claim 10, including a cache of the unsecured channel for caching content sent via the unsecured channel, and wherein a copy of the encrypted file is obtained from the cache of the unsecured channel responsive to a second request of the encrypted file, the second request occurring subsequent to the first request for the encrypted file.

17. The system of claim 10, wherein the group includes one or more of a persistent group and a file specific group.

18. The system of claim 12, wherein the network separation device is one or more of a firewall and a network address translator.

19. A non-transitory computing device usable medium including instructions that when executed on a computing device causes the computing device to:
encrypt a file;
send, via a secure channel and separate from the encrypted file, a packet to a group having one or more members, the group authorized to access the encrypted file, the packet associated with the encrypted file and including access information for the encrypted file;
receive a first request for the encrypted file from a first requestor; and
send the encrypted file to the first requestor via an unsecured channel that performs caching of the encrypted file, wherein the first requestor is able to access the encrypted file using the packet when the first requestor is a member of the group authorized to access the encrypted file and received the packet via the secure channel and unable to access the encrypted file when the first requestor is not a member of the group authorized to access the encrypted file.

20. The non-transitory computing device usable medium of claim 19, wherein the first requestor is located behind a network separation device, the computing device including instructions that when executed notify the first requestor located behind the network separation device of an existence of the file, receive a packet request from the first requestor and send the packet to the first requestor responsive to receiving the packet request and a determination that the first requestor is a member of the group.

* * * * *